Dec. 14, 1926

J. FLETCHER 1,610,433

THERMOSTATIC CONTROL DEVICE FOR CIRCULATING SYSTEMS

Original Filed July 24, 1922

Inventor
James Fletcher

Attorney

Patented Dec. 14, 1926.

1,610,433

UNITED STATES PATENT OFFICE.

JAMES FLETCHER, OF DETROIT, MICHIGAN.

THERMOSTATIC CONTROL DEVICE FOR CIRCULATING SYSTEMS.

Application filed July 24, 1922, Serial No. 577,251. Renewed June 3, 1926.

The invention relates to thermostatic control devices for circulating systems and is adapted particularly for use in regulating the flow of the water for cooling an internal combustion engine. One of the objects of the invention is the provision of a simple control device which comprises but few parts and may be readily installed. Other objects are to provide a device in which a thermostat functions as a valve and is freely movable; and to provide a device in which the thermostat is under tension to remain stationary until the temperature of the water has reached a predetermined degree. Further objects of the invention reside in the novel features of construction and combinations and arrangements of parts as more fully hereinafter set forth.

Figure 1:
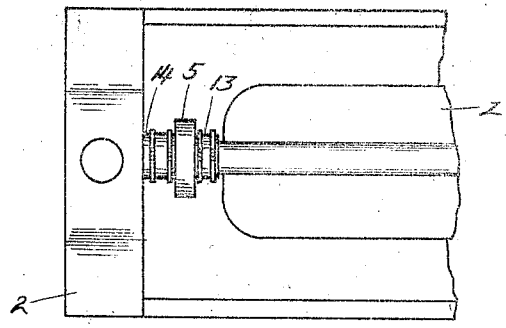
Figure 1 is a plan view of a portion of a motor vehicle including the internal combustion engine and radiator with my thermostatic control device applied.

As shown in the present instance, my thermostatic control device is applied to a motor vehicle having the water cooled internal combustion engine 1 and the radiator 2, this device forming part of the upper connection between the engine and radiator for the circulation of the cooling water.

The casing of the thermostatic control device comprises the cylindrical flanges 3 and 4 forming the inlet and outlet portions of the passage respectively and the intermediate enlarged portion 5 having parallel ends 6 and 7. 8 is a transverse plate within the casing and positioned midway of the inlet and outlet portions of the passage by the series of pins 9 and 10 secured to and extending transversely of the plate in opposite directions and engaging the end walls 7 and 6 respectively. 11 is the thermostat consisting of an annular bimetallic valve having overlapping ends which surrounds the series of pins 10 and is located between the end 6 of the enlarged portion of the casing and the radially extending pins 12 in the plane of the plate 8 and extending therefrom to the periphery of the enlarged portion 5 of the casing.

Figure 2:
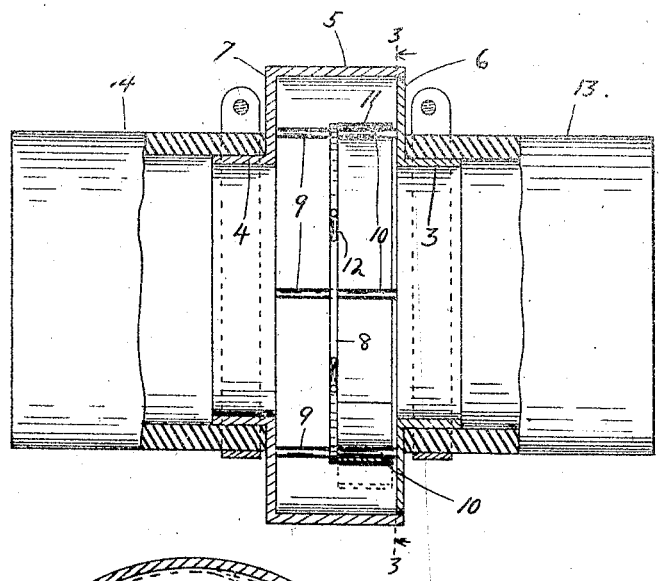
Figure 2 is a longitudinal section through the thermostatic control device.
Figure 3:
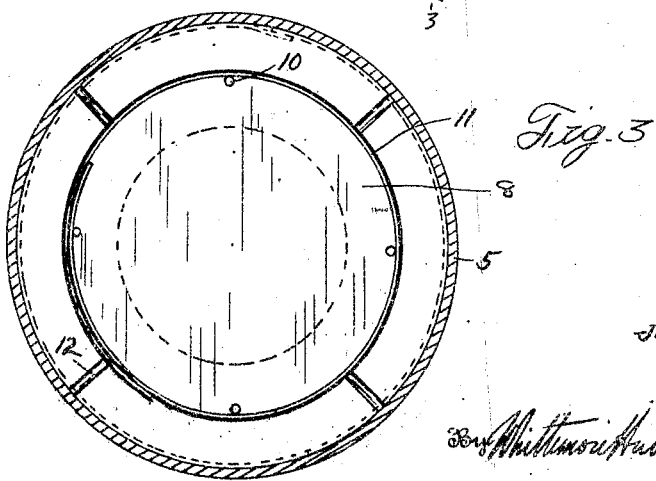
Figure 3 is a cross section on the line 3—3 of Figure 2.

The thermostatic valve 11 in normal position as shown by the full lines in Figure 2 as well as Figure 3, extends in close proximity to the periphery of the transverse plate 8 so that water entering through the cylindrical flange 3 will have but a restricted passage around the thermostatic valve through the intermediate passage formed between the periphery of the plate and the periphery of the enlarged portion of the casing and then through the cylindrical flange 4. However, when the temperature of the entering water has increased sufficiently, the thermostatic valve expands so that its lower portion occupies a position such as shown by the dotted lines in Figure 2 and permits of the freer passage of the water through the casing. As the temperature of the water increases, the thermostatic valve continues to expand until it lies adjacent to the inner periphery of the casing as shown by the dotted lines in Figure 3 when the maximum clearance is provided through the casing for the passage of the water.

The thermostatic valve is preferably placed under tension so that it will remain stationary in its normal or closed position until a predetermined temperature of water has been reached, after which, the valve will expand as the temperature of the water increases.

From the above description, it will be readily seen that I have provided a simple compact construction of thermostatic control device in which the thermostat functions as a valve and is freely movable, or in other words is free to expand and contract in accordance with temperature changes since it is guided only. Also the thermostatic valve being under tension when in closed or normal position remains stationary until the temperature of the water has reached a predetermined degree, after which the thermostatic valve expands as the temperature increases. Furthermore, my thermostatic control device may be readily applied owing to the fact that the rubber hose sections 13 and 14 may be forced over the cylindrical flange 3 and outlet connection of the engine, and cylindrical flange 4 and inlet connection of the radiator respectively, after which they may be secured by suitable clamps.

What I claim as my invention is:

1. A thermostatic control device comprising a casing having a passage, with substantially aligned inlet and outlet portions, and a thermostatic valve loosely mounted within said casing and controlling the communication of said portions.

2. A thermostatic control device comprising a casing having a passage with inlet and outlet portions and an intermediate portion, and an annular thermostatic valve loosely mounted within said casing and controlling the communication of one of said first-mentioned portions with said intermediate portion.

3. A thermostatic control device comprising a casing having a passage with inlet and outlet portions and an annular valve readily responsive to differential temperatures for controlling the communication between said portions, said valve in its normal position being under self contained tension to remain stationary until the temperature within said casing reaches a predetermined degree.

4. A thermostatic control device comprising a casing having a passage with inlet and outlet portions, and a loosely mounted annular valve readily responsive to differential temperatures for controlling the communication between said portions, said valve in its normal position being under tension to remain stationary until the temperature within said casing reaches a predetermined degree.

5. A thermostatic control device comprising a casing having a passage with inlet and outlet portions in substantial alignment, and an annular valve within said casing readily responsive to differential temperatures and controlling the communication between said portions.

6. A thermostatic control device comprising a casing having a passage with inlet and outlet portions in substantial alignment with each other and an intermediate portion, and a freely movable annular thermostatic valve having its axis substantially parallel to the axes of said inlet and outlet portions, said thermostatic valve controlling the communication between one of said first-mentioned portions and said intermediate portion.

7. A thermostatic control device comprising a casing having a passage with inlet and outlet portions in substantial alignment with each other and an intermediate portion, a transverse plate extending midway of said intermediate portion, and an annular thermostatic valve cooperating with said plate to control the communication between one of said first-mentioned portions and said intermediate portion.

8. A thermostatic control device comprising a casing having cylindrical flanges at its opposite ends, and an intermediate enlarged portion, a plate extending transversely of and midway between the ends of said intermediate portion, the periphery of said plate being spaced from the periphery of said intermediate portion, and an annular thermostatic valve for substantially closing the space between said plate and one of the ends of said enlarged portion.

9. In a thermostatic control device, the combination with a casing having a passage with substantially aligned inlet and outlet portions at its opposite ends and an intermediate enlargement, of a transversely extending plate midway of said portions and having the periphery spaced from the periphery of said enlargement and forming therewith an intermediate portion of said passage, guides between the peripheries of said plate and enlargement and a freely movable annular thermostatic valve between said guides and an end of said enlargement.

10. In a thermostatic control device, the combination with a casing having a passage with substantially aligned inlet and outlet portions at its opposite ends and an intermediate enlargement, of a transversely extending plate midway of and of greater area than the cross sectional area of either of said portions, the periphery of said plate being spaced from the periphery of said enlargement and forming therewith an intermediate portion of said passage, transversely extending pins secured to said plate for positioning the same midway of said intermediate portion, laterally extending pins upon said plate extending to the periphery of said enlargement, and a thermostatic valve having overlapping ends surrounding the pins extending transversely of said plate in one direction.

11. A thermostatic control device comprising a casing with a passageway having inlet and outlet portions, and an annular member loosely mounted within said casing and readily responsive to differential temperatures for controlling the communication between said portions.

12. A thermostatic control device comprising a casing with a passageway having inlet and outlet portions, and a loosely mounted annular member within said casing adapted to expand or contract circumferentially as the temperature rises or falls for controlling the communication between said portions, said member in its normal position being under self-contained tension to remain stationary until the temperature within said casing reaches a predetermined degree.

In testimony whereof I affix my signature.

JAMES FLETCHER.